(12) United States Patent
Rose

(10) Patent No.: US 11,294,783 B1
(45) Date of Patent: Apr. 5, 2022

(54) NON-INVASIVE PROGRAM EXECUTION PROTECTION

(71) Applicant: Raytheon Company, Waltham, MA (US)

(72) Inventor: Daniel Rose, Salado, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/031,240

(22) Filed: Sep. 24, 2020

(51) Int. Cl.
G06F 11/30 (2006.01)
G06F 11/07 (2006.01)
G06F 11/34 (2006.01)
G06F 8/41 (2018.01)

(52) U.S. Cl.
CPC .......... *G06F 11/3096* (2013.01); *G06F 8/434* (2013.01); *G06F 11/0772* (2013.01); *G06F 11/3461* (2013.01)

(58) Field of Classification Search
None
See application file for complete search history.

(56) References Cited

U.S. PATENT DOCUMENTS

| | | | | |
|---|---|---|---|---|
| 8,645,923 B1* | 2/2014 | Satish | ................. | G06F 9/44589 717/131 |
| 9,953,158 B1* | 4/2018 | Benameur | ............... | G06F 21/53 |
| 2004/0045018 A1* | 3/2004 | Nair | ........................ | G06F 8/443 719/331 |
| 2010/0023810 A1* | 1/2010 | Stolfo | ................. | G06F 11/0751 714/38.11 |
| 2012/0159630 A1* | 6/2012 | Wang | ...................... | G06F 21/51 726/24 |
| 2015/0356294 A1* | 12/2015 | Tan | ......................... | G06F 21/54 726/22 |
| 2015/0370560 A1* | 12/2015 | Tan | ..................... | G06F 9/30058 717/148 |
| 2016/0300060 A1* | 10/2016 | Pike | .................... | G06F 16/2365 |
| 2017/0371775 A1* | 12/2017 | Metzger | .............. | G06F 11/3692 |
| 2019/0205136 A1* | 7/2019 | Hu | ...................... | G06F 9/30079 |
| 2020/0026519 A1* | 1/2020 | Sultana | ............... | G06F 9/30058 |

\* cited by examiner

*Primary Examiner* — Qing Chen
(74) *Attorney, Agent, or Firm* — Daly, Crowley, Mofford & Durkee, LLP

(57) ABSTRACT

A method for use in a computing device having a processor, the method comprising: executing a computer program on the processor; while the computer program is running, detecting whether any of a plurality of transition instructions of the computer program is executed, the detecting being performed by using resources that are external to the computer program; in response to detecting that a given one of the transition instructions is executed, detecting whether a current execution flow of the computer program matches a control flow graph for the computer program; and performing a countermeasure action based on one of a mismatch of the current execution flow of the computer program and the control flow graph or a current value of a memory location associated with the computer program; wherein the control flow graph for the computer program is generated by simulating an execution of the computer program.

20 Claims, 5 Drawing Sheets

NON-INVASIVE PROGRAM EXECUTION PROTECTION

BACKGROUND

The prevention of software exploits is an ongoing concern to organizations and individuals alike. Software exploits commonly hijack the instruction pointer of a program in order to make the program execute code that is not native to the program. Detection of such exploits is an important aspect of guaranteeing the security of modern computing environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure, a method is provided for use in a computing device having a processor, the method comprising: executing a computer program on the processor; while the computer program is running, detecting whether any of a plurality of transition instructions of the computer program is executed, the detecting being performed by using resources that are external to the computer program; in response to detecting that a given one of the transition instructions is executed, detecting whether a current execution flow of the computer program matches a control flow graph for the computer program; and performing a countermeasure action based on one of a mismatch of the current execution flow of the computer program and the control flow graph or a current value of a memory location associated with the computer program; wherein the control flow graph for the computer program is generated by simulating an execution of the computer program.

According to aspects of the disclosure, a system, comprising: a memory; and a processor operatively coupled to the memory, the processor being configured to perform the operations of: executing a computer program on the processor; while the computer program is running, detecting whether any of a plurality of transition instructions of the computer program is executed, the detecting being performed by using resources that are external to the computer program; in response to detecting that a given one of the transition instructions is executed, detecting whether a current execution flow of the computer program matches a control flow graph for the computer program; and performing a countermeasure action based on one of a mismatch of the current execution flow of the computer program and the control flow graph or a current value of a memory location associated with the computer program; wherein the control flow graph for the computer program is generated by simulating an execution of the computer program.

According to aspects of the disclosure, a non-transitory computer-readable medium storing one or more processor-executable instructions, which when executed by a processor, cause the processor to perform the operations of: executing a computer program on the processor; while the computer program is running, detecting whether any of a plurality of transition instructions of the computer program is executed, the detecting being performed by using resources that are external to the computer program; in response to detecting that a given one of the transition instructions is executed, detecting whether a current execution flow of the computer program matches a control flow graph for the computer program; and performing a countermeasure action based on one of a mismatch of the current execution flow of the computer program and the control flow graph or a current value of a memory location associated with the computer program, wherein the control flow graph for the computer program is generated by simulating an execution of the computer program.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
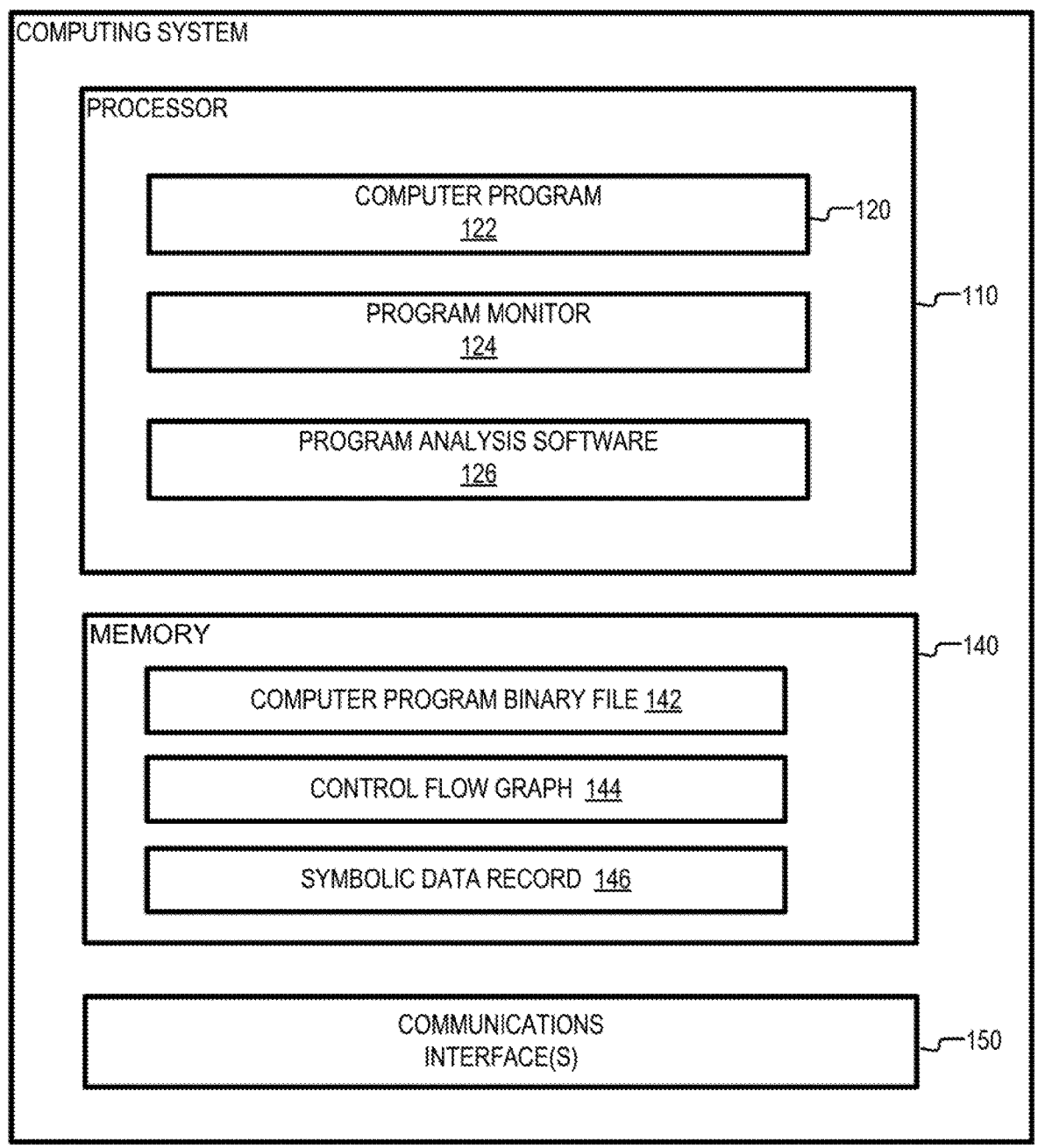
FIG. 1 is a diagram of an example of a computing system, according to aspects of the disclosure.

FIG. 1 is a schematic diagram of a computing system 100, according to aspects of the disclosure. As illustrated, the computing system 100 may include a processor 110 that is operatively coupled to a memory 140, and communications interface(s) 150. The processor 110 may include any suitable type of processing circuitry, such as one or more of an integrated circuit (ASIC), a field-programmable gate array (FPGA), and/or a general-purpose processor (e.g., an ARM-based processor, an x86 processor, etc.). The memory 140 may include any suitable type of volatile and/or non-volatile memory. For example, in some implementations, the memory 140 may include one or more of random-access memory (RAM), a read-only memory (ROM), a solid-state drive (SSD), electrically erasable programmable read-only memory (EEPROM), and/or any other suitable type of memory. The communications interface(s) 150 may include a Bluetooth interface, a Wi-Fi interface, a ZigBee interface, a Universal Serial Bus (USB) interface, and/or any other suitable type of interface.

The processor 110 may be configured to execute a computer program 122, a program monitor 124, and a program analysis software 126. The computer program 122 may include any suitable type of software. The program monitor 124 may include a utility that is configured to monitor the execution of the computer program 122 in real-time (i.e., as the computer program 122 is executing). The program monitor 124 may be arranged to detect exploits in the computer program 122 and/or other breaches of the integrity of the computer program 122. The program analysis software 126 may include software configured to perform symbolic and/or static analysis of binary files, such as the binary file 142, which is discussed below. In some implementations, the program analysis software may include off-the-shelf software, such as Angr™, IDA Pro™, and Binary Ninja™, for example.

The memory 140 may store a binary file 142 of the computer program 122, a control flow graph 144 for the computer program 122, and a symbolic data record 146 for the computer program 122. The control flow graph 144 may include one or more data structures that define a graph that models the execution of the computer program 122. The control flow graph 144 may be generated by the program analysis software 126. The control flow graph 144 may be generated based on the binary file 142 of the computer program 122 (e.g., by using the binary file to emulate the execution of the computer program 122).

The symbolic data record 146 may include one or more data structures that define the values of memory locations in the memory space of the computer program 122, at different points in the execution of the computer program 122. For example, the symbolic data record may identify the expected value of a memory location at a first time instant, the expected value of the same memory location at a second time instant, and the expected value of the memory location at a third time instant. The memory location may be a location where a particular variable (or object/object portion) of the computer program 122 is expected to be stored at run-time. The symbolic data record 146 may be generated by the program analysis software 126. The control flow graph 144 may be generated based on the binary file 142 of the computer program 122 (e.g., by using the binary file to emulate the execution of the computer program 122).

Figure 2:
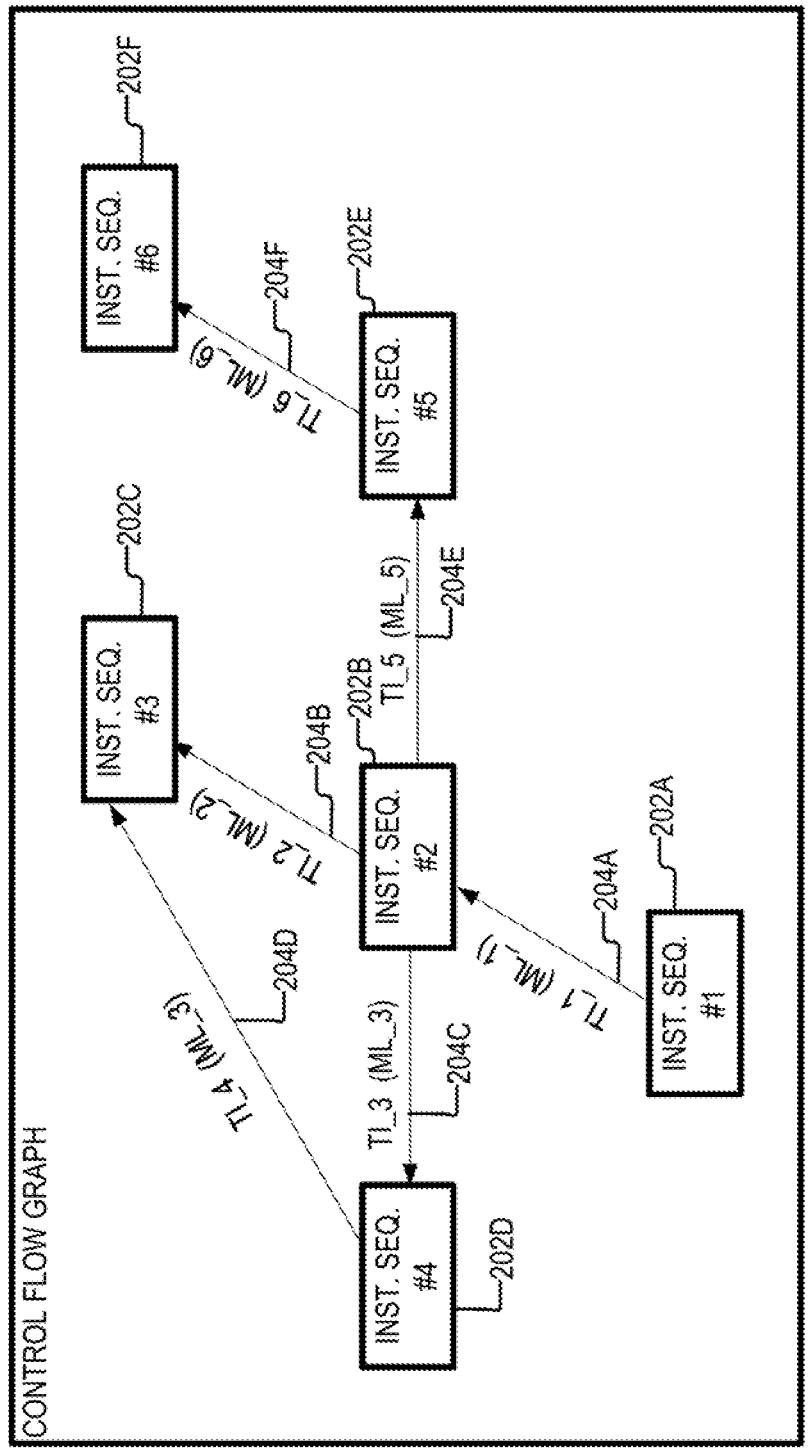
FIG. 2 is diagram of an example of a control flow graph, according to aspects of the disclosure.

FIG. 2 is a diagram of the control flow graph 144, according to aspects of the disclosure. As illustrated, the control flow graph may include a plurality of nodes 202 that are connected by edges 204. Each of the nodes 202 may correspond to a respective sequence of instructions, and each of the edges 204 may correspond to a transition instruction. Examples of transition instructions include jumps, calls, returns, etc. As used throughout the disclosure, the term "transition instruction" shall refer to any instruction that causes a computer program to begin executing a different instruction sequence and thus deviate from its default behavior of executing instructions in order.

According to the example of FIG. 2, node 202A is associated with a first sequence of instructions; node 202B is associated with a second sequence of instructions; node 202C is associated with a third sequence of instructions; node 202D is associated with a fourth sequence of instructions; node 202E is associated with a fifth sequence of instructions; and node 202F is associated with a sixth sequence of instructions. According to the example of FIG. 2, edge 204A corresponds to a first transition instruction, which transitions the flow of computer program 122 from the first instruction sequence to the second instruction sequence; edge 204B corresponds to a second transition instruction, which transitions the flow of computer program 122 from the second instruction sequence to the third instruction sequence; edge 204C corresponds to a third transition instruction, which transitions the flow of computer program 122 from the second instruction sequence to the fourth instruction sequence; edge 204D corresponds to a fifth transition instruction, which transitions the flow of computer program 122 from the fourth instruction sequence to the third instruction sequence; edge 204E corresponds to a fifth transition instruction, which transitions the flow of computer program 122 from the second instruction sequence to the fifth instruction sequence; and edge 204F corresponds to a sixth transition instruction, which transitions the flow of computer program 122 from the fifth instruction sequence to the sixth instruction sequence.

According to the example of FIG. 2, each transition instruction is identified by a memory address in the address space of the computer program 122, where the instruction is expected to be stored at run-time. Accordingly, in one respect, the control flow graph 144 represents the order in which different memory locations can be loaded into the instruction pointer of the computer program 122 (and/or processor), when the computer program 122 is executed.

As noted above, the control flow graph 144 may be generated (by program analysis software 126) by using the binary file 142 of the computer program 122 to emulate the execution of the computer program 122. If a part of the code is replaced with malware, or if the instruction pointer of the computer program 122 is hijacked during a subsequent (i.e., real) execution of the computer program 122, instructions would be loaded in the instruction pointer in a different order, and the current execution flow of the computer program 122 would not match the control flow graph 144. As is discussed further below, recognizing the mismatch may help detect that the integrity of the computer program has been compromised and take the appropriate countermeasures.

Figure 3:
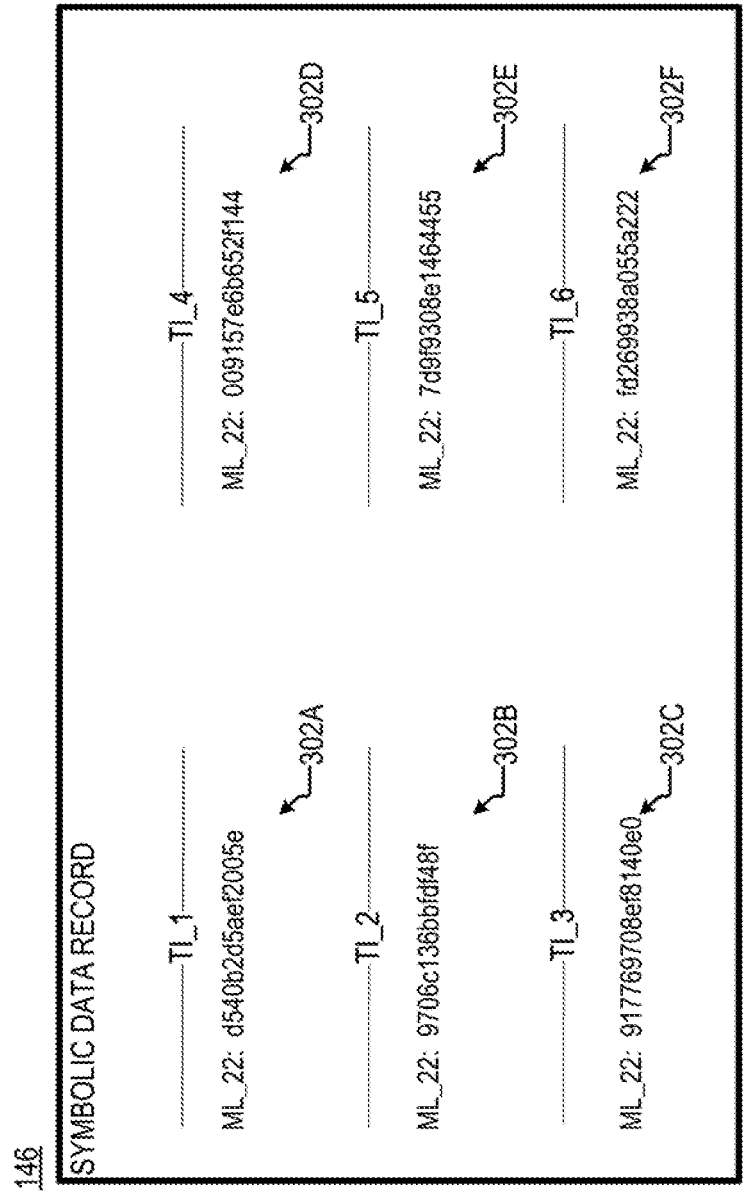
FIG. 3 is a diagram of an example of a symbolic data record, according to aspects of the disclosure.

FIG. 3 is a diagram of an example of the symbolic data record 146, according to aspects of the disclosure. The symbolic data record 146 may show how the value of a memory location ML_22 changes while the computer program 122 is being executed. The phrase "value of a memory location," as used throughout the disclosure, shall be interpreted as "data that is stored at the memory location" or "contents of the memory location." Memory location ML_22 may be a location in the address space of the computer program 122, where data that is generated as a result of executing the computer program 122 is stored. Memory location ML_22 may be a location in the address space of the computer program 122, where a variable (or object/object portion) is expected to be stored at run-time (when the computer program 122 is instantiated from the binary file 142).

According to the example of FIG. 3, the symbolic data record 146 includes a plurality of sections 302. Section 302A identifies a value, which memory location ML_22 is expected to have when the first transition instruction (TI_1) is executed; section 302B identifies a value, which memory location ML_22 is expected to have when the second transition instruction (TI_2) is executed; section 302C identifies a value, which memory location ML_22 is expected to have when the third transition instruction (TI_3) is executed; section 302D identifies a value, which memory location ML_22 is expected to have when the fourth transition instruction (TI_4) is executed; section 302E identifies a value, which memory location ML_22 is expected to have when the fifth transition instruction (TI_5) is executed; and section 302F identifies a value, which memory location ML_22 is expected to have when the sixth transition instruction (TI_6) is executed.

Although in the example of FIG. 3, each of the sections 302 identifies a single expected value for memory location ML_22, alternative implementations are possible in which any of the sections 302 includes more than one expected value for memory location ML_22. Moreover, further alternative implementations are possible in which any of the sections 302 specifies a range of acceptable (or expected) values for memory location ML_22. Although in the example of FIG. 3, the symbolic data record identifies expected values for one memory location, it will be understood that in practice the symbolic data record 146 could identify expected values for many different memory locations.

In some implementations, the symbolic data record 146 may be used to supplement the information found in the control flow graph 144. The symbolic data record 146 may be used to detect deviations in the execution of the computer program 122, which the program monitor 124 could not catch by using the control flow graph 144.

As noted above, the symbolic data record 146 may define valid (or expected values), which are expected to be stored at memory location ML_22, at different time instants in the execution of the computer program 122. These values may be determined by emulating the execution of the computer program 122 with the program analysis software 126. If the instruction pointer of the computer program 122 is hijacked to execute malicious code, data generated by the malicious code may be stored in memory location ML_22, but it may differ from the expected values that are specified by the symbolic data record 146. In this regard, any discrepancy between the contents of memory location ML_22 and the symbolic data record may signal that the integrity of the computer program 122 has been compromised (e.g., by an exploit, etc.).

Figure 4:
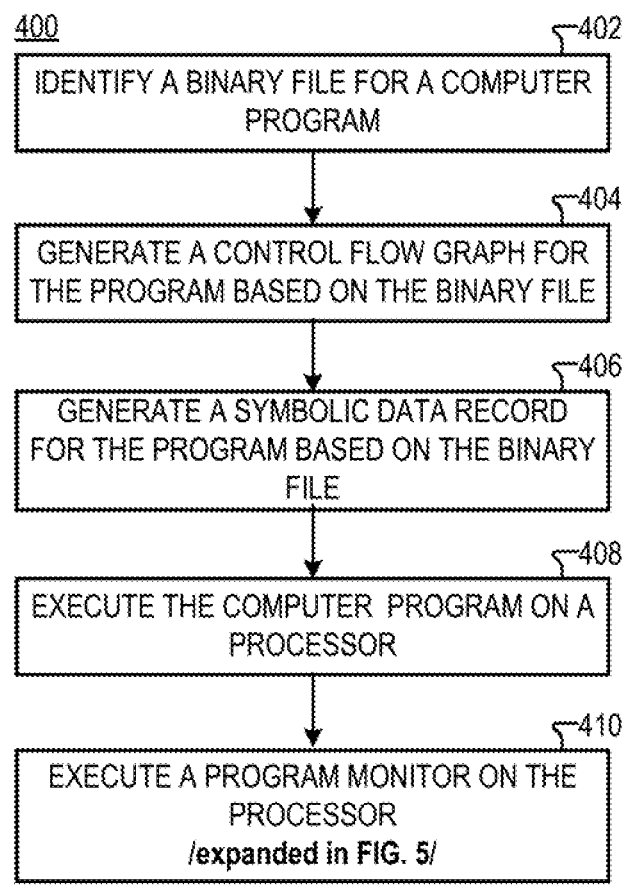
FIG. 4 is a flowchart of an example of a process, according to aspects of the disclosure.

FIG. 4 is a flowchart of an example of a process 400, according to aspects of the disclosure. At step 402, the binary file 142 of the computer program 122 is identified. At step 404, the control flow graph 144 is generated by the program analysis software 126. At step 406, the symbolic data record 146 is generated by the program analysis software 126. At step 408, the computer program 122 is executed on the processor 110. At step 410, the program monitor 124 is executed on the processor 110, concurrently with the computer program 122. In some implementations, when the program monitor 124 is executed, the program monitor 124 may perform a process 500, which is discussed further below with respect to FIG. 5.

Figure 5:
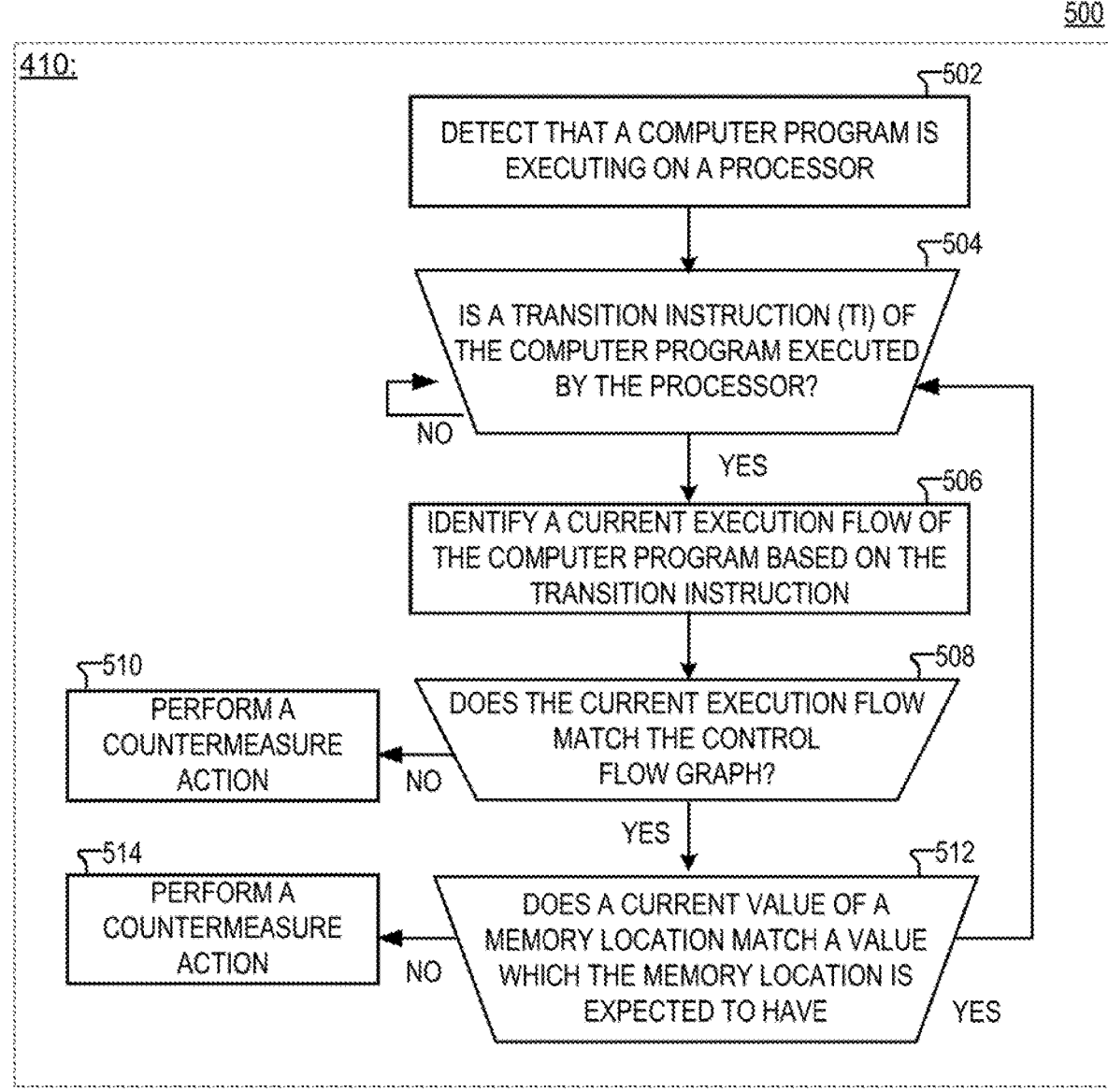
FIG. 5 is a flowchart of an example of a process, according to aspects of the disclosure.

FIG. 5 is a flowchart of an example of a process 500 for executing a program monitor, as specified by step 410 of the process 400. At step 502, the program monitor 124 detects that the computer program 122 is being executed by the processor 110. At step 504, the program monitor 124 detects if a transition instruction of the computer program 122 is executed by the processor 110. If the transition instruction is executed, the process 500 proceeds to step 506. Otherwise, step 504 is repeated. At step 506, the process 500 identifies a current execution flow of the computer program 122 based on the transition instruction (identified at step 504). At step 508, the program monitor 124 detects if the current execution flow of the computer program matches the control flow graph 144. If the current execution flow matches the control flow graph 144, the process 500 proceeds to step 512. Otherwise, if the current execution flow does not match the control flow graph 144, this is an indication that the integrity of the computer program 122 has been compromised, and the process 500 proceeds to step 510. At step 510, the program monitor 124 takes a countermeasure action. At step 512, the program monitor 124 determines if the current value of memory location ML_22 matches a value which the memory location is expected to have when the transition instruction (identified at step 504) is executed. If the current value of memory location ML_22 matches the value which memory location ML_22 is expected to have, the process 500 returns to step 504. Otherwise, if the current value of memory location ML_22 does not match the expected value, this is an indication that the integrity of the computer program 122 has been compromised, and the process 500 proceeds to step 514. At step 514, the program monitor 124 takes a countermeasure action. The process 500, in some implementations, may terminate after one of steps 510 or 514 is executed, or when the computer program 122 has finished executing.

Examples of several ways for performing step 504 are now described in further detail. It will be recalled that step 504 involves detecting if a transition instruction of the computer program 122 has been executed. In other words, at step 504, the program monitor 124 may identify which transition of the computer program 122 has been executed most recently. The final product of executing step 504 may be a memory address (in the memory space of computer program 122), from which the transition instruction has been loaded into the instruction pointer of the computer program 122. As discussed above, such a memory address can be compared against the control flow graph 144 (which also identifies memory addresses of transition instructions). The comparison may be performed after the offset of the memory space of the computer program 122 is taken into consideration.

In some implementations, the program monitor 124 may detect if a transition instruction is executed by using a hardware tracing feature, such as Intel Processor Trace™. The tracing feature may provide one or more trace packets to the program monitor 124. Each trace packet may identify an instruction that is executed by the processor 110. The program monitor 124 may examine each trace packet and determine if the packet's instruction is a transition instruction that is part of the computer program 122. If the packet's instruction happens to be a transition instruction of the computer program 122, the program monitor 124 may proceed to step 506. Additionally or alternatively, the program monitor 120 may detect if a transition instruction is executed by monitoring the instruction pointer of the computer program 122. For each instruction that is stored in the instruction pointer (i.e., for each new instruction address that is stored in the instruction pointer), the program monitor 124 may detect if the instruction is a transition instruction, and proceed to step 506 if the current instruction happens to be a transition instruction. Additionally or alternatively, in some implementations, detecting whether a transition instruction of the computer program is executed may include monitoring a call stack of an operating system that is executing the computer program 122 to determine whether any transition instructions have been executed.

Examples of several ways for performing step 506 are now discussed in further detail. It will be recalled that step 504 includes identifying a current execution flow of the computer program 122. In some implementations, the current execution flow may include only the transition instruction identified at step 504 (e.g., the current execution flow may include only the memory address of the transition instruction). Alternatively, in some implementations, the current execution flow of the computer program 122 may include the transition instruction of the computer program that has been executed most recently (i.e., the transition instruction detected at step 504), and one or more transition instructions that have been executed prior to the most recent transition instruction. For instance, the current execution flow may include transition instructions {T1, T2, and T3}, where the T1 is the most recent transition instruction, T2 is a transition instruction of the computer program 122 that has been executed immediately before T1, and T3 is a transition instruction of the computer program 122 that has been executed immediately before T2. In some implementations, each of the instructions T1-T3 may be represented, in the current execution flow, by a respective memory address (in the address space of the computer program 122), where the instruction is stored. Thus, in some implementations, the current execution flow of the computer program 122 may be a set of memory addresses, where each of the memory addresses corresponds to a transition instruction (of the computer program 122) that has been executed. The memory addresses may be arranged in the order in which the transition instructions have been executed. In some implementations, the current execution flow may include memory addresses corresponding to other types of instructions, in addition to transition instructions.

Examples of several ways for performing step 508 are now described in further detail. It will be recalled that step 508 involves detecting if the current execution flow of the computer program matches the control flow graph 144. As noted above, the current execution flow of the computer program 122 may identify a sequence of transition instructions (or other types of instructions) that have been executed up to a current time instant. In this regard, detecting if the current execution flow matches the control flow graph 144 may include detecting whether the control flow graph 144 includes a sequence of transition instructions that matches the current execution flow. As another example, detecting whether the control flow graph 144 matches the current execution flow may include detecting whether the control flow graph includes a path between the transition instruction (identified at step 504) and another transition instruction. The other transition instruction may be one that has not been executed yet (during the current run of the computer program 122) or a transition instruction that has been executed already (during the current run of the computer program 122).

Examples of several ways of performing step 512 are now described in further detail. It will be recalled that step 512 involves detecting if the current value of a memory location matches a value which the memory location ML_22 is expected to have. In some implementations, detecting if the current value of memory location ML_22 matches an expected value may include: (1) retrieving, from the symbolic data record 146, a section 302 that is associated with the transition instruction (detected at step 504), and (2) comparing the current value of memory location ML_22 to one or more values that are identified in the section 302. For example, the current value of memory location ML_22 may be said to match an expected value for memory location ML_22 if the current value of memory location ML_22 is equal to (or within a predetermined distance from) an expected value that is identified in the section 302. As another example, the current value of memory location ML_22 may be said to match an expected value for memory location ML_22 if the current value of memory location ML_22 is within an expected value range that is identified in the section 302. Although at step 512 only one memory location is validated, it will be understood that alternative implementations are possible in which multiple memory locations are validated in the same manner.

Examples of several ways for performing steps 510 and 514 are now described in further detail. It will be recalled that steps 510 and 514 involve performing a countermeasure action. Performing the countermeasure action may include one or more of stopping the execution of the computer program, outputting an alert, generating a log entry that indicates a presence of an anomaly in the execution of the computer program, powering down the computing system 100, and/or any other suitable action that one may take when they have recognized that malicious code might be running on their system. It will be understood that the present disclosure is not limited to any specific countermeasure action. The countermeasure action performed at step 510 may be the same or different from the countermeasure action that is performed at step 514.

According to aspects of the disclosure, the program monitor 124 may be non-invasive. In other words, the program monitor 124 may rely on resources that are external to the computer program 122, rather than relying on modifying the binary of the computer program 124 (e.g., by inserting breakpoints of trace code). As discussed above, resources external to the computer program may include an operating system call stack, a program trace feature that is provided by a processor, the instruction pointer of the computer program 124, and/or any other resource that is separate from the code of the computer program 124. One advantage of program monitor 124 is that it does not affect the run-time performance of the computer program 122 (because it does not insert code into the computer program 122). Another advantage of program monitor 124 is that it does not affect the load performance of the computer program 122 because it does not insert data (or code) into the memory that has been allocated to computer program 122 when the computer program 122 is being instantiated from the binary 142. Moreover, because the program monitor 124 does not insert code into the computer program 122, the program monitor 124 is not susceptible to measures which malware can take to avoid detection, such as deleting of trace code. More particularly, because the program monitor 124 is non-invasive, malware will not be able to detect its presence. This is important because some malware will look for modifications indicating that a program monitor is protecting a computer program/system and divert attacks to another part of the system. For instance, if malware detects such a program monitor, the invasive components of the program monitor may provide a map back to an attack surface of the program monitor. Malware can then take steps to attack the program monitor itself and discover important ways for hackers to disable the program monitor and/or improve future malware. And finally, the approach presented through the disclosure is advantageous because it does not require the user to be in possession of the source code of the computer program 122 in order for the user to implement the approach. As noted above, the control flow graph and the symbolic data record may be generated based on the program binary alone. Although in the examples of FIGS. 1-5, the control flow graph and the symbolic data record are generated by the same software, alternative implementations are possible in which they are generated by different software.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. As used throughout the disclosure, the term "context identifier" shall refer to any number, string, or alphanumerical string that implicitly or explicitly identifies a process. As used throughout the disclosure, the term "process" shall refer to a sequence of computer instructions that is scheduled independently by a scheduler, such as an operating system scheduler, a virtual machine scheduler, a hypervisor scheduler, and/or any other type of scheduler.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device having a processor, the method comprising:
   executing a computer program on the processor;
   while the computer program is running, detecting whether any transition instructions of a plurality of transition instructions of the computer program is executed, wherein the detecting is performed by using resources that are external to the computer program;
   in response to detecting that a given transition instruction of the plurality of transition instructions of the computer program is executed, retrieving a current value of a memory location associated with the computer program;
   detecting whether the current value of the memory location associated with the computer program matches one or more expected values for the memory location associated with the computer program that correspond to the given transition instruction, wherein the one or more expected values for the memory location associated with the computer program are identified based on a data record, and wherein the data record maps each transition instruction of the plurality of transition instructions of the computer program to one or more respective values, which the memory location associated with the computer program is expected to have when the transition instruction of the plurality of transition instructions of the computer program is executed; and performing a countermeasure action when the current value of the memory location associated with the computer program does not match the one or more expected values for the memory location associated with the computer program.

2. The method of claim 1, wherein performing the countermeasure action includes at least one of stopping an execution of the computer program, outputting an alert, and generating a log entry that indicates a presence of an anomaly in the execution of the computer program.

3. The method of claim 1, wherein detecting whether any transition instructions of the plurality of transition instructions of the computer program is executed includes monitoring an operating system call stack to detect execution of any transition instructions of the plurality of transition instructions of the computer program.

4. The method of claim 1, wherein detecting whether any transition instructions of the plurality of transition instructions of the computer program is executed includes monitoring trace packets that are provided by the processor to detect execution of any transition instructions of the plurality of transition instructions of the computer program.

5. The method of claim 1, wherein detecting whether any transition instructions of the plurality of transition instructions of the computer program is executed includes monitoring an instruction pointer register of the processor to detect execution of any transition instructions of the plurality of transition instructions of the computer program.

6. The method of claim 1, further comprising detecting whether a current execution flow of the computer program matches a control flow graph for the computer program when the given transition instruction of the plurality of transition instructions of the computer program is executed, wherein the countermeasure action is performed further based on a mismatch of the current execution flow of the computer program and the control flow graph for the computer program, and wherein the control flow graph for the computer program is generated by simulating an execution of the computer program.

7. The method of claim 6, wherein the current execution flow of the computer program includes one or more transition instructions of the computer program that have been executed prior to the given transition instruction of the plurality of transition instructions of the computer program.

8. A system, comprising:
a memory; and
a processor operatively coupled to the memory, the processor being configured to perform the operations of:
executing a computer program on the processor;
while the computer program is running, detecting whether any transition instructions of a plurality of transition instructions of the computer program is executed, wherein the detecting is performed by using resources that are external to the computer program;
in response to detecting that a given transition instruction of the plurality of transition instructions of the computer program is executed, retrieving a current value of a memory location associated with the computer program;
detecting whether the current value of the memory location associated with the computer program matches one or more expected values for the memory location associated with the computer program that correspond to the given transition instruction, wherein the one or more expected values for the memory location associated with the computer program are identified based on a data record, and wherein the data record maps each transition instruction of the plurality of transition instructions of the computer program to one or more respective values, which the memory location associated with the computer program is expected to have when the transition instruction of the plurality of transition instructions of the computer program is executed; and performing a countermeasure action when the current value of the memory location associated with the computer program does not match the one or more expected values for the memory location associated with the computer program.

9. The system of claim 8, wherein performing the countermeasure action includes at least one of stopping an execution of the computer program, outputting an alert, and generating a log entry that indicates a presence of an anomaly in the execution of the computer program.

10. The system of claim 8, wherein detecting whether any transition instructions of the plurality of transition instructions of the computer program is executed includes monitoring an operating system call stack to detect execution of any transition instructions of the plurality of transition instructions of the computer program.

11. The system of claim 8, wherein detecting whether any transition instructions of the plurality of transition instructions of the computer program is executed includes monitoring trace packets that are provided by the processor to detect execution of any transition instructions of the plurality of transition instructions of the computer program.

12. The system of claim 8, wherein detecting whether any transition instructions of the plurality of transition instructions of the computer program is executed includes monitoring an instruction pointer register of the processor to detect execution of any transition instructions of the plurality of transition instructions of the computer program.

13. The system of claim 8, further comprising detecting whether a current execution flow of the computer program matches a control flow graph for the computer program when the given transition instruction of the plurality of transition instructions of the computer program is executed, wherein the countermeasure action is performed further based on a mismatch of the current execution flow of the computer program and the control flow graph for the computer program, and wherein the control flow graph for the computer program is generated by simulating an execution of the computer program.

14. The system of claim 13, wherein the current execution flow of the computer program includes one or more transition instructions of the computer program that have been executed prior to the given transition instruction of the plurality of transition instructions of the computer program.

15. A non-transitory computer-readable medium storing one or more processor-executable instructions, which when executed by a processor, cause the processor to perform the operations of:
executing a computer program on the processor;
while the computer program is running, detecting whether any transition instructions of a plurality of transition instructions of the computer program is executed, wherein the detecting is performed by using resources that are external to the computer program;
in response to detecting that a given transition instruction of the plurality of transition instructions of the computer program is executed, retrieving a current value of a memory location associated with the computer program;

detecting whether the current value of the memory location associated with the computer program matches one or more expected values for the memory location associated with the computer program that correspond to the given transition instruction, wherein the one or more expected values for the memory location associated with the computer program are identified based on a data record, and wherein the data record maps each transition instruction of the plurality of transition instructions of the computer program to one or more respective values, which the memory location associated with the computer program is expected to have when the transition instruction of the plurality of transition instructions of the computer program is executed; and performing a countermeasure action when the current value of the memory location associated with the computer program does not match the one or more expected values for the memory location associated with the computer program.

16. The non-transitory computer-readable medium of claim 15, wherein performing the countermeasure action includes at least one of stopping an execution of the computer program, outputting an alert, and generating a log entry that indicates a presence of an anomaly in the execution of the computer program.

17. The non-transitory computer-readable medium of claim 15, wherein detecting whether any transition instructions of the plurality of transition instructions of the computer program is executed includes monitoring an operating system call stack to detect execution of any transition instructions of the plurality of transition instructions of the computer program.

18. The non-transitory computer-readable medium of claim 15, wherein detecting whether any transition instructions of the plurality of transition instructions of the computer program is executed includes monitoring trace packets that are provided by the processor to detect execution of any transition instructions of the plurality of transition instructions of the computer program.

19. The non-transitory computer-readable medium of claim 15, wherein detecting whether any transition instructions of the plurality of transition instructions of the computer program is executed includes monitoring an instruction pointer register of the processor to detect execution of any transition instructions of the plurality of transition instructions of the computer program.

20. The non-transitory computer-readable medium of claim 15, further comprising detecting whether a current execution flow of the computer program matches a control flow graph for the computer program when the given transition instruction of the plurality of transition instructions of the computer program is executed, wherein the countermeasure action is performed further based on a mismatch of the current execution flow of the computer program and the control flow graph for the computer program, and wherein the control flow graph for the computer program is generated by simulating an execution of the computer program.

* * * * *